United States Patent [19]
Zamitter et al.

[11] Patent Number: 4,972,920
[45] Date of Patent: Nov. 27, 1990

[54] WHEEL SUSPENSION OF A MOTORCYCLE

[76] Inventors: Mikhail N. Zamitter, ulitsa Aviakonstruktora Antonova, 2/32, korpus 4, kv. 18, Kiev; Vladimir N. Kljubin, Reutov, ulitsa Lenina, 12 kv. 18 Moskovskaya oblast; Bogdan A. Nichai, ulitsa Tatarskaya, 3/2, kv. 138, Kiev; Anatoly M. Miichenko, ulitsa Zhdanova, 59, kv. 3, Kievskaya oblast, Boyarka, all of U.S.S.R.

[21] Appl. No.: 449,864
[22] PCT Filed: Apr. 14, 1988
[86] PCT No.: PCT/SU88/00080
§ 371 Date: Dec. 21, 1989
§ 102(e) Date: Dec. 21, 1989
[87] PCT Pub. No.: WO89/09719
PCT Pub. Date: Oct. 19, 1989
[51] Int. Cl.$^5$ ............................................. B62K 11/00
[52] U.S. Cl. .................................. 180/227; 180/219; 280/699; 280/718; 267/227; 267/229; 267/36.1; 267/47
[58] Field of Search ............ 267/24, 31, 32, 44, 267/47, 227, 229, 241, 36.1; 280/699, 718, 697, 669, 710, 712, 65, 66, 67; 180/229, 219

[56] References Cited
U.S. PATENT DOCUMENTS

| | | |
|---|---|---|
| 4,082,307 | 4/1978 | Tait . |
| 4,429,760 | 2/1984 | Zoizumi et al. .................... 180/215 |
| 4,763,885 | 8/1988 | Zamitter ......................... 267/229 X |

FOREIGN PATENT DOCUMENTS

| | | |
|---|---|---|
| 0249539 | 12/1987 | European Pat. Off. .............. 267/31 |
| 2495094 | 6/1982 | France . |
| 2038736 | 7/1980 | United Kingdom . |

Primary Examiner—Charles A. Marmor
Assistant Examiner—Martin W. Gerich
Attorney, Agent, or Firm—Fleit, Jacobson, Cohn, Price, Holman & Stern

[57] ABSTRACT

A wheel suspension of a motorcycle comprises a resilient element (1) C-shaped in the flexure plane and pivotably connected by ends thereof to a swinging arm (5) carrying the wheel, and to the frame (3) of the motorcycle. The resilient element (1) of the suspension ensures a higher riding performance of the motorcycle thanks to improved compliance of the end portions of the element (1) functioning as leaf springs towards the least resistance, whereas the middle portion of the resilient element (1) works in the direction of the most resistance.

1 Claim, 3 Drawing Sheets

WHEEL SUSPENSION OF A MOTORCYCLE

FIELD OF THE INVENTION

This invention relates to shock absorbing suspensions of vehicles and, more particularly, to a front or rear wheel suspension of a motorcycle.

BACKGROUND OF THE INVENTION

Most of the known wheel suspensions of motorcycles include a guide means in the form of a swinging arm or fork carrying the wheel, and a resilient element in the form of a coil spring the interior of which accommodates a means for suppressing oscillations or a hydraulic shock absorber pivotably connected to the frame of the motorcycle and to the swinging arm at the length thereof between its swing axis and the wheel axis.

Such suspensions are described, for example, in the publication "Mototsikl Dnepr-16", 1985, the Avtoexport Publishers, Moscow.

Construction of such suspension in the form of coil springs, despite small overall size thereof, requires much metal to be consumed for manufacture. For example, the quantity of metal consumed for the resilient arrangement of the rear wheel suspension of such heavy class motorcycle as the "Dnepr" amounts to 0.0023 kg per unit (newton) static load. By way of comparison, it should be noted that in the dump truck KamAZ-5510 (cf., I. M. Jurkovsly and V. A. Tolpygin "Avtomobil KamAZ", 1975, the DOSAAF Publishers, Moscow) the similar factor is 0.00178 kg/N, an improvement by 29%.

There is known a more advanced wheel suspension of the "Dnepr" motorcycle (cf., "Mototsikl Dnepr-16", 1985, the Avtoexport Publishers, Moscow) comprising a swinging arm carrying the wheel, and a resilient element with a shock absorber connected to the swinging arm. The resilient element is fashioned as a cylindrical coil spring, whereas the shock absorber has the form of a hydraulic-action suppressor of oscillations accommodated concentrically inside the resilient element.

However, apart from the aforedescribed metal over-consumption, this known suspension includes excessive number of working parts. In addition, the suspension fails to ensure a sufficiently smooth ride, and in certain operating conditions fails to get rid of substantial inertia loads imparted to the riders and to the motorcycle structure during recoil.

SUMMARY OF THE INVENTION

The invention aims to provide a motorcycle wheel suspension with a resilient element which would be more pliant during the wheel travel than in the known constructions of wheel suspensions, require less metal for its fabrication and ensure a smoother riding performance of the motorcycle.

The aims of the invention are attained by that in a wheel suspension of a motorcycle comprising a swinging arm carrying the wheel, and a resilient element with a shock absorber connected to the swinging arm and to the frame, according to the invention, the resilient element is C-shaped in the flexure plane and includes a middle portion with a straight neutral line and end portions with a curved neutral line, the resilient element having a substantially uniform cross sectional configuration and area through its length; in the middle portion all the major long axes of inertia of the cross sections being similar and resting in the flexure plane of the resilient element, the major short axes of inertia having an equal length; in the end portions the major long axes of intertia gradually shortening, while the major short axes of inertia gradually elongating to the extent that at a certain point of the cross section they become equal in length to the major long axes of inertia.

The proposed suspension makes motorcycle ride smoother thanks to optimizing the non-linear resilient characteristic. In addition, impact loads imparted to the riders and motorcycle frame are reduced thanks to that the C-shaped resilient element acts to absorb the dynamic action during recoil as effectively as in the work travel. In the middle portion the resilient element is flexed in the plane of the highest rigidity, whereas in the end portions, starting from the cross section where the two major moments of inertia are equal, it is flexed in the direction of the least rigidity, i.e., the end portions are more pliant. In addition, the proposed suspension requires less metal for its manufacture than the known suspensions.

BRIEF DESCRIPTION OF THE DRAWINGS

The invention will now be described in greater detail with reference to the accompanying drawings, where like elements are assigned like reference numerals, and where.

BEST MODE OF CARRYING OUT THE INVENTION

Figure 1:
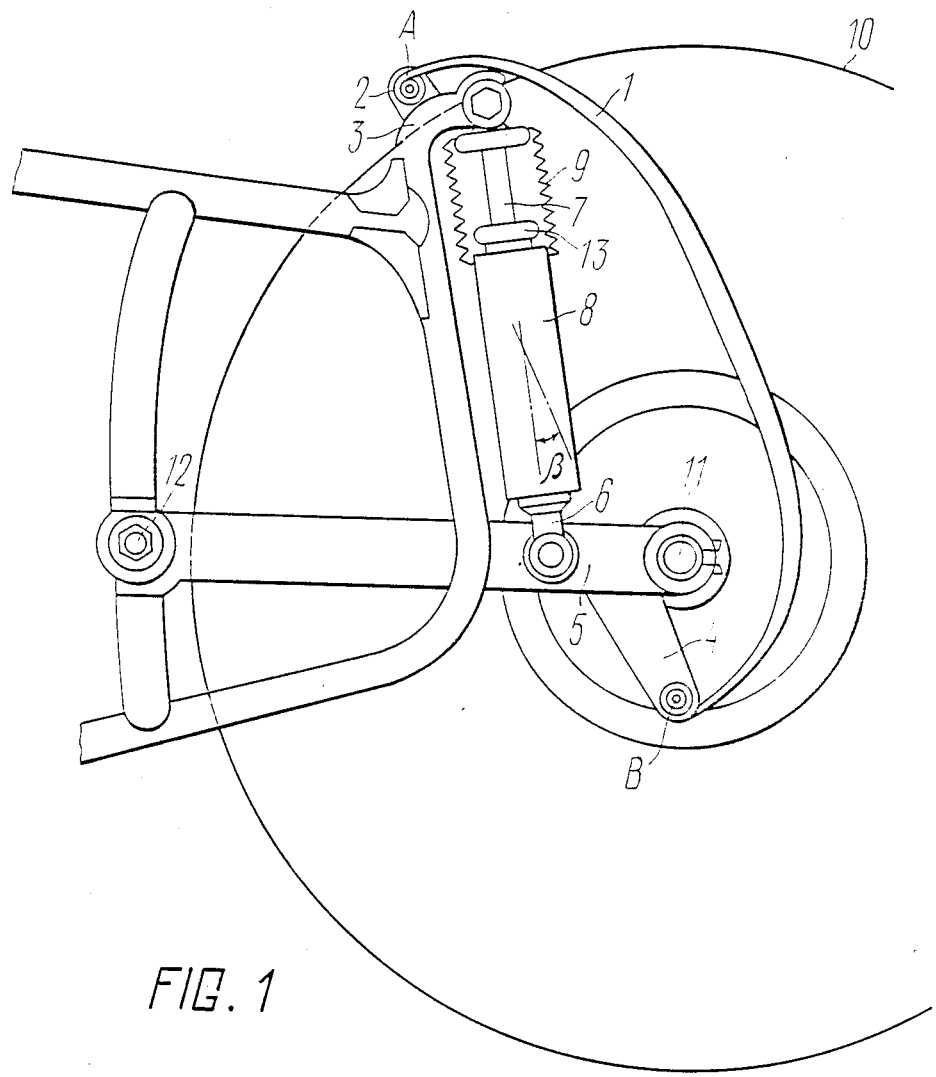
FIG. 1 is a general view of a suspension, according to the invention, as applied to the rear wheel of a motorcycle.

The wheel suspension of a motorcycle, according to the invention, can be used both for the front motorcycle wheel and for the rear wheel. FIG. 1 shows one embodiment of the invention as applied to the rear wheel of a motorcycle.

The proposed rear wheel suspension of a motorcycle comprises a resilient element or spring 1 C-shaped in the flexure plane and pivotably secured on a lug 2 of a frame 3 of the motorcycle (not shown) by one end or eye thereof with a geometrical axis A, and by the other end or eye secured on a lug 4 of a swinging arm 5 with a geometrical axis B. One end of a shock absorber 6 is connected pivotably to the swinging arm 5, whereas the other end of the shock absorber 6 is connected to the frame 3 of the motorcycle. The shock absorber 6 has a rod 7 movable relative to a housing 8 and enclosed at its top portion by a corrugated rubberized hose 9. A wheel 10 of the motorcycle is mounted on an axle 11 at the free end of the swinging arm 5. The other end of the swinging arm 5 is pivotably connected by a pin 12 to the frame 3 of the motorcycle. A cushioning ring 13 is arranged concentrically with the rod 7 of the shock absorber 6.

Figure 2:
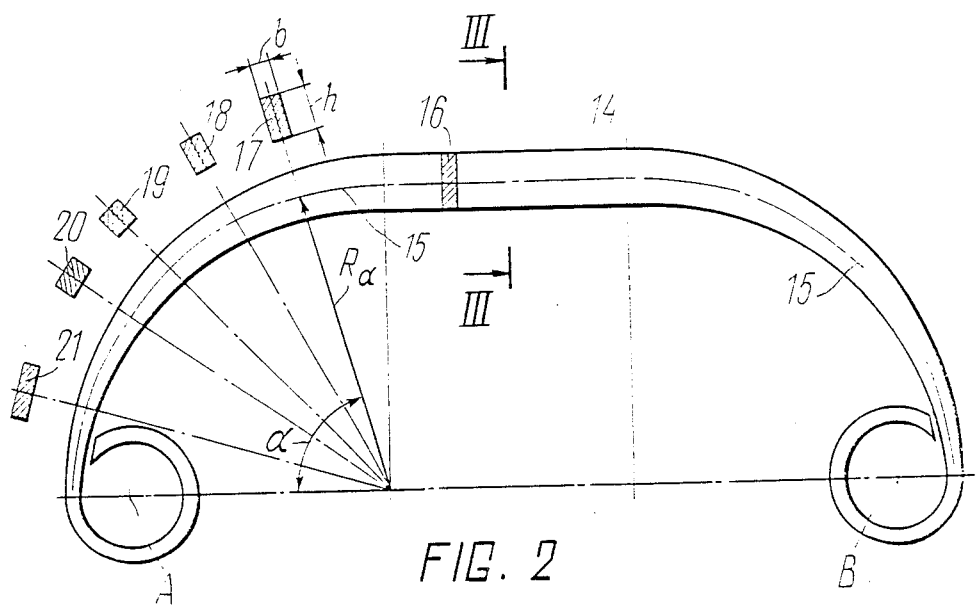
FIG. 2 is a front projection of a resilient element of the proposed suspension.
Figure 3:
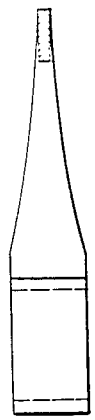
FIG. 3 is a section taken along the line III—III in FIG. 2 of the resilient element.

Referring now to FIG. 2, the spring 1 includes a middle portion 14 having a straight neutral line and two end portions 15 having curved neutral lines. Cross sections of the spring 1 indicated at 16, 17, 18, 19, 20 and 21 are of similar configurations, in this case rectangulars of the same cross sectional area and gradually varying side sizes. At the middle portion 14 major axes of inertia are disposed so that the axis with respect to which the moment of inertia is maximum runs across the flexure plane, whereas at the end portions 15 the section axis relative to which the moment of inertia is minimum lies in the flexure plane or plane through which runs the neutral line; flexural stresses in any section of the spring 1, apart from portions immediately adjoining the spring eyes with axis A and B, being equal. As can be seen from FIGS. 2 and 3, at the middle portion 14 all the long major axes of inertia of the cross sections are equal and the major short axes of inertia are also equal therebetween. At the end portions 15 the major long axes of inertia progressively shorten, while the major short axes of inertia elongate to a certain cross section 19, where they are equal with the major long axes of inertia. Importantly, the terms "major long axis of inertia" and "major short axis of inertia" in this context are assigned to quite definite axes to be thereafter used even when the long axis of inertia becomes shorter than the short axis of inertia, as seen best in position 18 of FIG. 2.

The proposed suspension operates in the following manner.

When the wheel 10 fails to touch a bearing surface, the spring 1 is stretched and flexed by virtue of the forces of gravity exerted thereon by the wheel 10 and swinging arm 5, and by a balancing reaction force applied to the lug 2. The rod 7 of the shock absorber is projected from the housing 8 to a substantial part of its length. In the static position represented in FIG. 1 the axis 11 of the wheel 10 is acted upon by a static load exerted on this wheel. This load is balanced by the reaction of the bearing surface transmitted to the wheel tire.

The static load causes the spring 1 to compress and bend, whereby the distance between the axes A and B thereof tends to reduce as compared with the heretofore described initial state. The swinging arm 5 turns counterclockwise from its initial position to act on the shock absorber 6 and cause its housing 8 to raise upwards of the rod 7.

A growth in the load exerted on the wheel causes an increase in compression and flexure of the spring 1 to result in a more pronounced departure of the swinging arm 5 from the initial position.

Under the maximum load the swinging arm 5 moves to its extreme position, the distance between the axes A and B of the spring 1 is brought to the minimum, and the housing 8 of the shock absorber moves up the rod 7 so that the cushioning rubber ring 13 is clamped between the upper end of the housing 8 and a thrust collar of the rod 7, whereby a subsequent movement of the links of the suspension mechanism is terminated.

During recoil the inertia load acting on the wheel 10 and swinging arm 5 causes stretching and flexure of the spring 1 to result in reduced magnitude of inertia loads imparted to the motorcycle riders and elements of kinematic pairs of the suspension mechanism, and smoother ride of the motorcycle.

The motorcycle runs smoother also due to the non-linear resilient characteristic of the spring 1, since during operation the distance between the interaxis line A-B and neutral line 14 of the midportion of the spring 1 changes to cause variations in the rigidity of the spring 1, viz., increasing its rigidity during stretching and reducing its rigidity during compression.

Demands imposed by the object of the present invention on the motorcycle suspension can be most satisfactorily met by positioning the spring 1 to the rear of the axis of the wheel 10.

For example, in the "Dnepr" motorcycle suspension, as in other prior art constructions of motorcycle suspensions, the spring is subjected to the almost ultimate stress during maximum loads.

By using the herein proposed spring and positioning this spring after the wheel axis it is possible to reduce by 40–43 % the amount of metal to be consumed for the resilient element of the suspension and ensure that the spring can withstand the same stresses.

The thus attained advantageous effect can be accounted for by both the novel arrangement of the resilient element and specific merits of the spring 1.

Positioning the resilient element rearwards of the axis of the wheel 10 makes it possible to balance the moment of force applied to the wheel 10 relative to the axis 12 of the swinging arm 5 by a substantially smaller force than the force loading the spring arranged between the axis of oscillation of the swinging arm and the wheel axis in the known motorcycle suspension. The proposed spring also can have a substantially smaller longitudinal dimension (distance between the eye axes) than the known plate spring as exemplified in U.S. Pat. No. 1,040,244.

The spring 1 of the rear wheel suspension of a motorcycle is preferably positioned to the rear of the axis 11 of the wheel 10, and should be arranged so that the line between the eye axes be at an angle $\beta$ to the axis of the shock absorber 6 (FIG. 1) arranged similarly to the prototype suspension.

The optimum range for the angle $\beta$ is 10°–20°. At a smaller angle the spring can be in the way of the attachment of the shock absorber 6, whereas an excessive angle increases the longitudinal load P exerted on the spring 1, since the vertical component $P_v$ of this force balancing a preset load Q imposed on the wheel is expressed as $P_v = Q = P\cos \beta$, and consequently $$P = \frac{Q}{\cos \beta}.$$

The spring 1 of the proposed suspension differs from the known plate spring (cf., U.S. Pat. No. 1,040,244) by that it includes three parts or zones contrasting by the arrangement of the major axes of inertia of their cross sections.

In the middle zone including the portion 14 of the spring with a straight neutral line (FIG. 2) and adjacent extreme portions 15 with curvilinear neutral lines and extending from the middle of the spring to the section 19, where the major axes of inertia are of equal length, flexure under load occurs in the plane of the highest rigidity of the sections 16, 17, 18 to withstand the flexure moments at a small mass of the metal. Therefore, in this zone the spring works similarly to the aforementioned known plate spring.

In the two extreme zones extending from the eyes to said section 19, where the axes of inertia are of equal length, flexure under load takes place in the plane of the least rigidity of the cross section 20, 21 of the spring, as in the known leaf springs. Provision of these zones ensures low rigidity of the spring.

A combination of such zones in a single spring structure provides a spring of low mass and high resiliency to be hereinafter referred to as a plate-leaf spring.

The resilient characteristic of a suspension provided with such a spring in non-linear to the optimum, which ensures a smooth ride of the motorcycle at any speed on any road surface, since this novel spring absorbs with equal efficiency the dynamic loads both during the upward travel of the wheel and during recoil.

At the same time, the aforedescribed features of the plate-leaf spring allow the required wheel travel, while providing a suitable arrangement of the resilient element in the suspension, ensuring high load bearing capacity and low mass of the spring.

Generally, the cross sectional configuration of this spring can be different, e.g., it can be elliptical, oval, H-shaped, etc. However, the rectangular shape is preferable for reasons of greater ease of manufacture and strength.

Particularly, when the spring is elliptical or oval, the area of cross sections remote from the neutral line is smaller than that of the rectangular cross sections, and therefore with the equal height of sections, the strength of the oval shape is less than of the rectangular. For example, if the cross section of the proposed spring is oval with semiaxis a and b, then the surface area of this cross section will be:

$$S = \pi a b,$$

with the moment of resistance relative to the major axis:

$$W_e = \frac{\pi a b^2}{4}.$$

With the height of the rectangular cross-section $h = 2b$, the width of the rectangular cross-section of the area S will be:

$$b_r = \frac{S}{h} = \frac{\pi a}{2}.$$

The moment of resistance of this section relative to the neutral axis $b_r$ will be:

$$W_r = \frac{b_r h^2}{6} = \frac{\pi a b^2}{3}.$$

Flexing the spring of elliptical cross section relative to the major axis of the ellipse by the moment M will cause the highest normal flexural stress:

$$\sigma_e = \frac{M}{W_e} = \frac{4M}{\pi a b^2}.$$

Accordingly, the highest flexural stress of the spring of rectangular cross section of the same cross sectional area will be:

$$\sigma_r = \frac{M}{W_r} = \frac{3M}{\pi a b^2},$$

that is smaller by 33%.

Dimensions of the rectangular cross sections $b_r$ and $h_r$ (FIG. 2) depend on the radius vector $R_\alpha$ and the angle $\alpha$ at which it is arranged relative to the spring eye axes.

Cross sectional dimensions of the plate-leaf spring capable of ensuring similarity between the highest normal flexural stresses through the length of almost all of its working portion can be determined from the following formula.

The flexure moment in a section at an angle $\alpha$ to the line A–B of the spring due to the force P directed along this line is:

$$M_\alpha = PR_\alpha \sin \alpha.$$

The required moment of resistance of the equally strong sections of the spring at an angle $\alpha$ is:

$$W_\alpha = \frac{PR_\alpha \sin \alpha}{\sigma \alpha}.$$

For the plate-leaf spring with rectangular sections of the same area $F = b_\alpha h_\alpha = \text{const}$; in consequence:

$$W_\alpha = \frac{F h_\alpha}{6} \text{ and } h_\alpha = \frac{6 PR_\alpha \sin \alpha}{F \sigma \alpha}.$$

Figure 4:
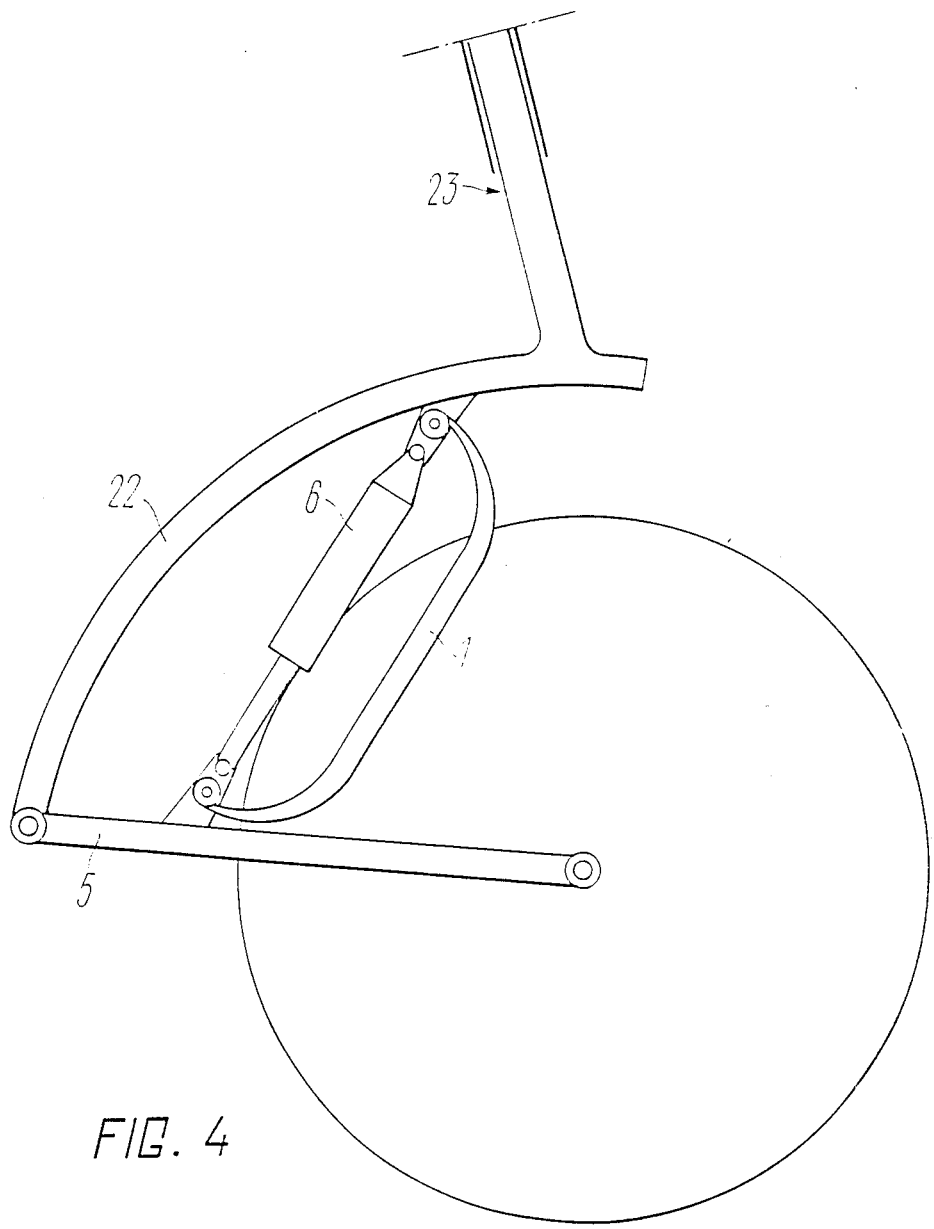
FIG. 4 is a general view of the proposed suspension as applied to the front wheel of a motorcycle.

As can be seen in FIG. 4, the front wheel suspension of a motorcycle, according to the invention, differs from the rear wheel suspension (FIG. 1) by that connection of the spring 1, swinging arm 5 and shock absorber 6 with the frame 3 of the motorcycle is done through an arcuate element 22 and steering column 23 which does not involve the inventive step and is therefore evident for those skilled in the art.

Industrial Applicability

The proposed motorcycle wheel suspension can be used in all types of motorcycles without changing their construction.

We claim:

1. A wheel suspension of a motorcycle comprising a swinging arm carrying a wheel, a resilient element and a shock absorbing means connected to the swinging arm and to the motorcycle frame, characterized in that the resilient element (1) is C-shaped in the plane of flexure and has a middle portion (14) with a straight neutral line and end portions (15) with a curvilinear neutral line, cross sections along the length of the resilient element (1) having a substantially equal cross sectional area, in the middle portion (14) all major long axes of inertia are equal in length and in the flexure plane of the resilient element (1), the major short axes of inertia are also being equal in length therebetween; in the end portions (15) the major long axes gradually reduce in length and the major short axes gradually increase in length so that at a certain point (19) they become equal in length to the major long axes of inertia.

* * * * *